(12) United States Patent
Buysch et al.

(10) Patent No.: US 6,350,920 B1
(45) Date of Patent: Feb. 26, 2002

(54) METHOD FOR PREPARING POLYETHER POLYOLS

(75) Inventors: Hans-Josef Buysch, Krefeld; Manfred Dietrich, Leverkusen; Pramod Gupta, Bedburg; Pieter Ooms, Krefeld, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/485,507

(22) PCT Filed: Aug. 5, 1998

(86) PCT No.: PCT/EP98/04860
§ 371 Date: Mar. 20, 2000
§ 102(e) Date: Mar. 20, 2000

(87) PCT Pub. No.: WO99/09087
PCT Pub. Date: Feb. 25, 1999

(30) Foreign Application Priority Data

Aug. 18, 1997 (DE) .......................... 197 35 795

(51) Int. Cl.$^7$ ............................... C07C 43/11
(52) U.S. Cl. .................. 568/620; 568/621; 568/623; 568/624
(58) Field of Search .................. 568/621, 606, 568/613, 623, 624, 620

(56) References Cited

U.S. PATENT DOCUMENTS

| | | | | |
|---|---|---|---|---|
| 3,528,920 A | | 9/1970 | Niizeki et al. | 252/73 |
| 4,029,879 A | | 6/1977 | Muzzio | 536/4 |

FOREIGN PATENT DOCUMENTS

| | | | |
|---|---|---|---|
| EP | 0 383 333 | * | 8/1990 |
| EP | 0 641 814 | * | 3/1995 |
| JP | 56022323 | * | 3/1981 |

* cited by examiner

*Primary Examiner*—Rosalynd Keys
(74) *Attorney, Agent, or Firm*—Joseph C. Gil; N. Denise Brown

(57) ABSTRACT

Polyether polyols can be prepared by reacting polyols with epoxides in the presence of basic catalysts, by treating the polyether polyols containing the basic catalysts with OH-functional solid compounds of metals of groups III to VIII of the periodic system of the elements (Mendeleyev), the compounds being insoluble in the polyether polyols and having BET surface areas of from 10 to 1000 m$^2$/g, isolating the solid inorganic compounds laden with the basic catalysts from the polyether polyol and using them in the reaction of polyols with epoxides, or bringing the isolated inorganic compounds laden with the basic catalysts into contact with the polyols that are to be used in the reaction with epoxides, separating those polyols from the inorganic compounds and delivering them to the reaction with epoxides.

2 Claims, No Drawings

METHOD FOR PREPARING POLYETHER POLYOLS

This application is a 371 of PCT/EP98/04860, filed Aug. 5, 1998.

The present invention relates to a process for the preparation of polyether polyols by reacting polyols with epoxides in the presence of basic catalysts, by removing the bases from the polyethers by means of OH-functional solid inorganic metal compounds, returning the base-laden compounds to the reaction of polyols with epoxides or treating the base-laden compounds with polyols and using those polyols in the reaction with epoxides.

From U.S. Pat. No. 3,528,920 it is known to remove basic catalysts used in the preparation of polyether polyols from the polyether polyols. In order to remove the basic catalysts, the polyether polyols were neutralised with sulfuric acid then treated with magnesium silicate, dried and subsequently distilled at elevated temperature in order to remove water. The magnesium silicate was then separated from the polymer product in a separate step.

U.S. Pat. No. 4,029,879 discloses an improved process for removing basic catalysts from polyether polyols by treating the polyether polyols with magnesium silicate in the presence of from 1 to 5 wt. % water. In a separate step, the adsorbent must then be separated from the polyether polyol by filtration and the water must be separated off by distillation.

Disadvantages of the above-mentioned processes are the large number of purification steps, the use of acids for neutralisation, and the formation of unrecoverable, economically and ecologically unsound, contaminated magnesium silicate waste. Owing to the known processes for removing catalysts from polyether polyols, which are associated with the described disadvantages, the processes used hitherto are not very economical.

The object of the present invention is to make available an economically and ecologically advantageous process for removing basic catalysts from polyether polyols, which avoids the disadvantages of the known processes.

The present invention provides a process for the preparation of polyether polyols by reacting polyols with epoxides in the presence of basic catalysts, which process is characterised in that the polyether polyols containing the basic catalysts are treated with OH-functional solid compounds of metals of groups III to VIII of the periodic system of the elements (Mendeleyev), the said compounds being insoluble in the polyether polyols and having BET surface areas of from 10 to 1000 m$^2$/g, the solid inorganic compounds laden with the basic catalysts are isolated from the polyether polyol and used in the reaction of the polyols with epoxides, or the isolated inorganic compounds laden with the basic catalysts are brought into contact with the polyols that are to be used in the reaction with epoxides, those polyols are separated from the inorganic compounds and delivered to the reaction with the epoxides.

The preparation of polyether polyols has long been known and is described in general terms, for example, in Kunststoffhandbuch, Volume 7, Polyurethane, Carl Hanser Verlag, Munich-Vienna, 1973, p. 58 ff. All known polyols come into consideration as starter compounds for the epoxide polymerisation. Special mention may be made of mono-, di-, tri- and tetra-ethylene glycol, mono-, di-, tri- and tetrapolypropylene glycol, 1,2-, 1,3-, 1,4-butanediol, glycerol, trimethylolpropane, trimethylolethane, pentaerythritol, hexanetriol, sugars, such as saccharose, fructose, maltose, sucrose, xylose, sorbitol, palatinitol, xylitol, oxyalkylation products of ammonia and amines, such as ethylenediamine, diethylenetriamine, piperazine, aniline, toluylenediamine, methylenedianiline, phenols such as hydroquinone, resorcinol, pyrocatechols, bisphenol F, bisphenol A and their oxyalkylation products, and also so-called prepolymers, which are obtained by reacting the above-mentioned polyols with from 0.5 to 4 mol, preferably from 0.7 to 2 mol, of epoxide/mol of polyol.

There are preferably used mono- to tetra-ethylene glycol, mono- to tetra-propylene glycol, glycerol, trimethylolpropane, pentaerythritol and the above-mentioned sugars and their hydrogenation products.

Suitable epoxides are ethylene oxide, propylene oxide, butylene oxide, cyclohexene oxide, styrene oxide and mixtures of those epoxides. Ethylene oxide and propylene oxide are preferred.

There are used as basic catalysts especially potassium hydroxide and sodium hydroxide.

As mentioned above, the basic catalysts remain in the polyether polyols when the polyether polyols are prepared and must be removed therefrom.

By the process according to the invention it is now possible to remove the basic catalysts by treating the polyether polyols containing the basic catalysts with OH-functional solid compounds of metals of groups III to VIII of the periodic system of the elements, the said compounds being insoluble in the polyether polyols. There may be mentioned as OH-functional compounds of metals preferably the hydroxides and hydroxy oxides of aluminium, gallium, silicon, tin, titanium, zirconium, hafnium, tantalum, niobium and iron, especially the hydroxides and hydroxy oxides of aluminium, silicon, tin, titanium, zirconium, tantalum and niobium, very especially of aluminium, silicon, titanium, tantalum and niobium. Of course, the hydroxides and hydroxy oxides of the mentioned metals may also be used in the form of chemical compounds or in mixtures with one another. Mention may be made of, for example, aluminium-silicon hydroxy oxides and titanium-zirconium hydroxy oxides.

It is also possible to mix the mentioned hydroxides and hydroxy oxides with other metal compounds, such as magnesium silicates or aluminium titanates, as well as with layered silicates of the montmorillonite, bentonite and (hydro)talcite type. The amount of such admixed metal compounds is, depending on the procedure, up to 500 parts by weight, preferably 200 parts by weight, based on 1 part by weight of basic catalyst.

Very special preference is given to the use of the hydroxy oxides of the above-mentioned metals.

The amount of the above-mentioned solid inorganic compounds to be used is up to 1000 parts by weight, preferably up to 400 parts by weight, based on 1 part by weight of basic catalyst.

The adsorbents of the above-described type used in the process according to the invention for removing the basic catalysts are described, for example, in Ullmann's Encyclopedia of Industrial Chemistry, 5th edition, Vol. A1, 557 ff; A27, 74 ff; A20, 190–271 and 297–311; A24, 12 ff; A26, 78 ff; A17, 255 ff; A23, 583–791.

The adsorbents used have a BET surface area of from 10 to 1000 m$^2$/g, preferably from 20 to 900 m$^2$/g, especially from 25 to 800 m$^2$/g. They can be used as powders or in the form of course-ground material, granules, spheres, cylindrical bodies, hollow cylindrical bodies, or rings. The OH-functional surfaces of the mentioned hydroxides and hydroxy oxides are obtained especially by suitable methods of calcining precipitated hydroxy oxides of the mentioned metals or their gel-like hydrates at relatively low temperatures. The preparation of such surface-rich hydroxides and hydroxy oxides of the above-mentioned metals is known and is described, for example, in Kirk Othmer, Encyclopedia of Chemical Technology, 3rd edition, Vol. 2, p. 218 ff (1978); Ullmann's Encyclopedia of Industrial Chemistry under the metal names indicated above.

In the preparation of polyether polyols there are used as basic catalysts in addition to potassium and sodium hydroxide mentioned above also the hydroxides of the other alkali metals and those of the alkaline earth metals, although to a lesser degree. In addition, it is possible to use as basic catalysts tertiary amines, such as triethylamine, tributylamine, tetramethylethylenediamine, pentamethylenediethylenetriamine, diethylpiperazine, methyl-diaza-bicycloundecene, methyl-diaza-bicyclononene and pentamethylguanidine.

Implementation of the process according to the invention involves in principle the following operations:

reaction of the polyols with epoxides in the presence of basic catalysts to form polyether polyols, treatment of the polyether polyols with the OH-functional, solid, insoluble, inorganic metal compounds, separation of the polyether polyols from the solid metal compounds containing the basic catalysts, treatment of the metal compounds isolated from the polyether polyols and containing the basic catalysts with the polyols provided for reaction with epoxides, reaction with the epoxides.

In technical terms it is possible to carry out those basic operations in various ways, either in a discontinuous, a semi-continuous or a fully continuous procedure.

All operations and procedures are preferably carried out at temperatures of from 80 to 190° C., especially from 100 to 180° C., and at from 0.5 to 20 bar, preferably from 0.8 to 15 bar, and it is entirely possible to conduct the individual operations within a procedure at different temperatures and pressures.

The amount of polyols for treating the metal compounds containing the basic catalysts can readily be determined by appropriate tests and, depending on the procedure and the catalyst content of the metal compound, may be from 1 to 200 times, preferably from 3 to 150 times, especially from 5 to 100 times, the amount of catalyst with which the metal compound is laden.

In a particular form, discontinuous operation may be, for example, as follows: in a reactor, the reaction of polyol with epoxides in the presence of a basic catalyst is carried out in a known manner, excess epoxide is driven off after the reaction, a suitable amount of a metal compound to be used according to the invention is added and the polyether polyol is treated therewith, then the metal compound laden with catalyst is separated from the polyether polyol by filtration, centrifugation or another separating operation and that filtration or centrifugation residue is introduced into the reactor and the next reaction of polyol with epoxide is catalysed therewith. It is also possible to treat the catalyst-containing residue with the appropriate amount of the polyol that is to be used for the next batch, remove the catalyst therewith, separate off the metal compound and use the polyol, which now contains catalyst, in the reaction with epoxide.

In a specific embodiment, a semi-continuous procedure may be carried out, for example, as follows:

From a storage container, polyol or a prepolymer (prepared from the polyol by addition of only a few mol of epoxide per mol of polyol) (PL) is introduced into at least one vessel I containing a bed of the metal compound, which bed is largely saturated with catalyst and still contains polyether polyol (PE). PL passes into the bed, drives the PE that is still present out of the bed and removes the catalyst from the metal compound. When PE has left the bed in the direction towards a collecting vessel, the stream of PL is passed into a reaction zone and reacted with the desired amount of epoxide. Residues of unreacted epoxide are blown out and the PE obtained is passed into at least one vessel II which, analogously to I, contains a bed of the metal compound, but that bed is free or largely free of catalyst. As it passes through II, the PE is freed of catalyst and collected. That entire procedure can be repeated until I is depleted of catalyst and II is largely saturated with catalyst. The direction of flow is then reversed, PL is passed through II, the reaction is carried out in the reaction zone and the catalyst is retained in I. The PL that is initially still present in I is expelled from the bed by the incoming PE and is ready for further reactions.

Another particular embodiment of the process according to the invention is a fully continuous procedure and it may be so arranged that in the above-mentioned semi-continuous process, the reaction zone is also set up for continuous operation and is used accordingly:

From a storage container, therefore, PL is passed continuously through at least one bed of the metal compounds (I) that is largely saturated with catalyst, is reacted continuously with epoxide in the reaction zone, and then PE is continuously freed of catalyst in at least one second bed (II) containing metal compound. When bed I is depleted of catalyst and bed II is largely saturated, the direction of flow is reversed and PL is passed through II, reacted with epoxide again in the reaction zone and separated from the catalyst in I.

Of course it is possible in the various procedures to allow the reaction with epoxides also to take place partially in the beds containing the metal compound.

The reaction zone may be constructed of different apparatuses and may consist of, for example, a stirrer vessel cascade, chamber reactors, reaction tubes with plug flow and mixing elements, of reaction distillations, which also permit the removal, in parallel with the reaction, of allyl alcohol and excess epoxide, and other reactors suitable for continuous liquid/gas reactions, as are described in greater detail, for example, in Ullmann's Encyclopedia of Industrial Chemistry, 5th edition, Vol. B4, 87 ff, 99 ff, 106–328, 561 ff and Vol. B3, 7–5 to 7–10, and Perry's Chemical Engineers Handbook, 6th edition, 4–24 to 4–52.

Depending on the nature and form of the adsorbent and of the resistance to flow associated therewith, the vessels for the adsorbent bed may be slim columns with a deep adsorbent bed or, alternatively, broad drum-like containers with a flat bed through which material can flow easily. In order to avoid back-mixing, the inlet and outlet regions are, for example, to be conical in shape and filled with filling material.

The above descriptions of particular embodiments of the process according to the invention show that the basic catalysts are retained over a prolonged period and are not destroyed by neutralisation, are removed from the polyether polyol in a very simple manner, without the need for additional means and energy, and no longer appear and have to be handled outside the actual production unit.

EXAMPLES

Example 1

440 g of a solution of a polyether, prepared from 3% trimethylolpropane (wt. %), 80% propylene oxide and 17% ethylene oxide having a molecular weight of 4800 and an OH number of 35, containing 0.25% potassium in toluene (1/1), were stirred for one hour at 85° C. with 32 g of an aluminium oxide hydrate (Camag 5016/A). After filtering off with suction, washing with toluene and drying, the aluminium oxide hydrate contained 1.3% potassium and the polyether contained 61 ppm of potassium.

On treating the isolated aluminium oxide with a 3.8-fold amount of glycerol at 85° C. for one hour, its potassium content fell by 74% and the glycerol then contained 0.14% potassium.

This Example shows, in the first part, that KOH is removed virtually quantitatively from a catalyst-containing polyether polyol by means of an aluminium oxide and, in the second part, that ¾ of the adsorbed amount of KOH is desorbed from that aluminium oxide again by simple treatment with the polyol glycerol.

Example 2

When Example 1 was repeated without toluene using 220 g of polyether and 32 g of aluminium oxide, 103 ppm of potassium remained in the polyether.

Example 3

When Example 1 was repeated using a silicon dioxide (Grace 432), no potassium (<1 ppm) was found in the polyether. When Example 2 was repeated using the above silicon dioxide, 10 ppm of potassium were found in the polyether.

This Example shows that the various metal compounds have different effects under comparable conditions.

Example 4

50 g of prepolymer consisting of approximately 70 wt. % trimethylolpropane and 30 wt. % propylene oxide (which had been freed of KOH) were gassed with propylene oxide for 12 hours in a 250 ml three-necked flask, with vigorous stirring at 250 rpm, at from 100 to 120° C. and at normal pressure, together with 5 g of $Al_2O_3$ which came from a polyether polyol purification and contained 1.2 wt. % potassium. The increase in mass as a result of the polymerisation of propylene oxide was 17 wt. %.

Example 5

When Example 4 was repeated using an $Al_2O_3$ from a PE purification that contained 2.3 wt. % potassium, an increase in mass of 196 wt. % was obtained as a result of the polymerisation of propylene oxide.

Comparison Examples 6 and 7

When Example 4 was repeated without addition or with pure $Al_2O_3$, polymerisation of propylene oxide was not observed.

Examples 4 and 5 prove that the KOH-laden metal compounds as such, without previously being treated separately with polyol, catalyse the reaction of polyols with epoxides. According to Comparison Examples 6 and 7, no reaction takes place without addition and with pure aluminium oxide.

What is claimed is:

1. A process for the preparation of polyether polyols comprising reacting polyols with epoxides in the presence of basic catalysts, wherein the polyether polyols containing the basic catalysts are treated with OH-functional solid compounds comprising:

(i) the hydroxides of aluminum, gallium, silicon, tin, titanium, zirconium, hafnium, tantalum, niobium or iron;

(ii) the hydroxy oxides of aluminum, gallium, silicon, tin, titanium, zirconium, hafnium, tantalum, niobium or iron;

or (iii) mixtures thereof;

wherein the OH-functional solid compounds are insoluble in the polyether polyols and have BET surface areas of from 10 to 1000 $m^2/g$;

the solid inorganic compounds laden with the basic catalysts are isolated from the polyether polyol and used in the reaction of polyols with epoxides, or the isolated inorganic compounds laden with the basic catalysts are brought into contact with the polyols that are to be used in the reaction with epoxides, those polyols are separated from the inorganic compounds and delivered to the reaction with epoxides.

2. The process of claim 1, characterized in that the solid inorganic compounds are used in amounts of up to 1000 parts by weight, based on 1 part by weight of basic catalyst.

* * * * *